United States Patent
Faingersh et al.

(10) Patent No.: US 9,484,800 B2
(45) Date of Patent: Nov. 1, 2016

(54) SOFT-START CIRCUIT FOR SWITCHING REGULATOR

(71) Applicant: Tower Semiconductor Ltd., Migdal Haemek (IL)

(72) Inventors: Alexander Faingersh, Bat Shlomo (IL); Erez Sarig, Kadima (IL)

(73) Assignee: Tower Semiconductor Ltd., Migdal Haemek (IL)

( * ) Notice: Subject to any disclaimer, the term of this patent is extended or adjusted under 35 U.S.C. 154(b) by 401 days.

(21) Appl. No.: 14/198,477

(22) Filed: Mar. 5, 2014

(65) Prior Publication Data

US 2015/0256060 A1   Sep. 10, 2015

(51) Int. Cl.
  *G05F 1/00* (2006.01)
  *H02M 1/36* (2007.01)
  *H02M 3/156* (2006.01)

(52) U.S. Cl.
  CPC ............... *H02M 1/36* (2013.01); *H02M 3/156* (2013.01)

(58) Field of Classification Search
  CPC .............. G05F 1/00; G05F 1/10; G05F 1/12; G05F 1/46
  USPC ................ 323/234, 237, 265, 266, 273–275, 323/282–285
  See application file for complete search history.

(56) References Cited

U.S. PATENT DOCUMENTS

| 7,378,827 B2 * | 5/2008 | Stoichita | G05F 3/242 323/285 |
| 2009/0115379 A1 * | 5/2009 | Al-Shyoukh | G05F 1/56 323/238 |
| 2012/0169302 A1 | 7/2012 | Huang et al. | |

FOREIGN PATENT DOCUMENTS

EP          2528213 A2     11/2012

* cited by examiner

*Primary Examiner* — Adolf Berhane
*Assistant Examiner* — Afework Demisse
(74) *Attorney, Agent, or Firm* — Bever, Hoffman & Harms, LLP

(57) ABSTRACT

A soft-start circuit for a switching regulator (e.g., a buck converter) in which the soft-start circuit supplies a DC ramp voltage to the switch regulator's pre-driver such that the pulsed gate voltage supplied to power switch during the initial soft-start operating phase includes a series of pulses having amplitudes that respectively gradually change (e.g., sequentially increase from 0V to the system operating voltage), whereby the regulated output voltage passed from the power switch to the load is gradually increased at a rate that prevents voltage overshoot and inrush current. The DC ramp voltage is generated, for example, by a current source that begins charging a capacitor at the beginning of the initial soft-start operating phase. This arrangement allows a constant-frequency ramp signal generated by a single oscillator to be shared by multiple switch regulators that are fabricated on an IC chip.

19 Claims, 8 Drawing Sheets

SOFT-START CIRCUIT FOR SWITCHING REGULATOR

FIELD OF THE INVENTION

The invention relates generally to switching regulators and, more particularly, to the startup operation of buck converters.

BACKGROUND OF THE INVENTION

Switching-type regulators (aka switched-mode power supplies or switch regulators) are electronic power supplies that typically utilize a high current switch (e.g., a MOSFET) along with an oscillator and pulse width modulator (PWM) to convert the voltage and current characteristics of a DC supply voltage in order to supply a load circuit with either a stepped-up (increased) voltage/current or a stepped-down (decreased) voltage/current. The oscillator, PWM and switch are connected in a closed loop system with the loop feedback usually compared with a reference voltage, and the result is modulated by the PWM, which in turn controls the switch's duty cycle to provide a regulated direct current (DC) voltage output signal. Buck converters are switching-type voltage regulators in which the output voltage is substantially lower ("stepped down") than the source (input) voltage. In contrast, up-converters are switching-type voltage regulators in which the regulated output exceeds the input supply voltage, and positive-to-negative or negative-to-positive polarity converters are switching-type voltage regulators in which the regulated output is inverted. In terms of power supply efficiency switching-type regulators can operate at about 90% or better.

FIG. 6 is a simplified circuit diagram showing an exemplary conventional buck converter 50 including an error amplifier 51, a pulse width modulator (PWM) circuit 52, an oscillator 53, a pre-driver (amplifier) 54, a power transistor 55, and an output inductor $L_{OUT}$. Error amplifier 51 compares a reference voltage $V_{REF}$ and a feedback signal $V_{FB}$, and generates an output signal $V_{EA-OUT}$ that is applied to PWM 52. In general, PWM circuit 52 compares error amplifier output signal $V_{EA-OUT}$ with an oscillating ramp signal $V_{OSC-RAMP}$ supplied by oscillator 53, and produces a square wave signal $V_{PULSE}$ having a duty cycle whose instantaneous value is related to the voltage level of error amplifier output signal $V_{EA-OUT}$. In current mode convertors, a first feedback circuit adds an additional voltage $V_{ILOUT}$, which is proportional to inductor current $I_{LOUT}$, to oscillator ramp signal $V_{OSC-RAMP}$ such that the gradient of oscillating ramp signal $V_{OSC-RAMP}$ is determined not only by oscillator 53, but is also made proportional to the inductor current $I_{LOUT}$ by way of additional voltage $V_{ILOUT}$. Square wave signal $V_{PULSE}$ is amplified by pre-driver 54 to generate a square-wave gate voltage $V_{GN}$, which is made up of a series of voltage pulses $V_{GN-P}$ that are applied to the gate of power transistor 55. Power transistor 55 is turned on and off in accordance with the duty cycle of gate voltage $V_{GN}$, thereby generating an inductor voltage $V_{LOUT}$ at node N that toggles with the same frequency (duty cycle) as square wave signal $V_{PULSE}$ and square-wave gate voltage $V_{GN}$. Inductor voltage $V_{LOUT}$ is passed through output inductor $L_{OUT}$, thereby generating regulated output voltage $V_{OUT}$ that is supplied to a target load circuit L, which for simplicity is represented by a capacitor $C_L$ and a resistor $R_L$. A portion of regulated output voltage $V_{OUT}$ is fed back as feedback signal $V_{FB}$ to error amplifier 51 via a suitable second feedback circuit (e.g., the divider formed by resistors $R_1$ and $R_2$), whereby the duty cycle of PWM circuit 52 is maintained at a level that generates the duty cycle needed to produce the desired regulated voltage $V_{OUT}$.

A problem associated with conventional buck converters is voltage overshoot and inductor current at start-up (i.e., when power is initially supplied to buck converter 50). Before start-up, load capacitance $C_L$ is fully discharged, and output voltage $V_{OUT}$ is zero. At start-up (e.g., when power $V_{DD}$ is initially applied), because output voltage $V_{OUT}$ is initially 0V, reference voltage $V_{REF}$ will dominate the operation of error amplifier 51, thus causing it to generate output signal $V_{EA-OUT}$ that maximizes the duty cycle of PWM circuit 52 in an effort to charge load capacitor $C_L$ as rapidly as possible. The resulting surge can damage power transistor 55 and typically overshoots the desired output voltage, possibly overloading the input supply and/or damaging load L. The surge also generates a high inrush current via output inductor $L_{OUT}$.

FIG. 7(A) is a timing diagram illustrating a generalized conventional "soft-start" (SS) process, which is used to address the start-up overshoot problem associated with conventional buck converters by causing output voltage $V_{OUT}$ to gradually rise from 0V to the desired nominal level during a soft-start period prior to normal operation. The basic method for implementing a conventional SS process is to control the error amplifier output signal $V_{EA-OUT}$ such that it increases gradually at start-up, which causes the duty cycle of PWM 52 to gradually increase, which in turn limits the amount of current passed by power transistor 55 to load L via output inductor $L_{OUT}$. As indicated in FIG. 7(A), the gradual increase of error amplifier output signal $V_{EA-OUT}$ is typically achieved by causing reference voltage $V_{REF}$ to slowly increase from 0V to a normal operating level (e.g., over a 600 micro-second period starting at initial start-up time t0), thereby limiting the output of error amplifier 51 according to the slowly increasing reference voltage $V_{REF}$. The resulting gradual increase of error amplifier output signal $V_{EA-OUT}$ prevents significant load surge by causing output voltage $V_{OUT}$ to gradually increase. At the end of the soft-start period (i.e., at the beginning of "normal" converter operation), reference voltage $V_{REF}$ is maintained at its predetermined fixed value, and error amplifier output signal $V_{EA-OUT}$ is adjusted in accordance with the fed back portion of output voltage $V_{OUT}$ in the manner described above.

FIG. 7(B) illustrates an "initial SS phase" problem associated the conventional basic soft-start approach illustrated in FIG. 7(A) that arises while error amplifier output signal $V_{EA-OUT}$ is "out of dynamic range" (i.e., too low), which prevents buck converter 50 from starting properly. Referring to FIG. 6, PWM 52 generates output voltage $V_{PULSE}$ (and, effectively, gate voltage $V_{PULSE}/V_{GN}$) having pulse widths that are based on a duty cycle determined by a comparison between error amplifier output signal $V_{EA-OUT}$ and oscillating ramp signal $V_{OSC-RAMP}$ (plus the additional voltage $V_{ILOUT}$, which is proportional to inductor current $I_{LOUT}$). As indicated in FIG. 7(B), the "initial SS phase" problem arises because, while error amplifier output signal $V_{EA-OUT}$ gradually increases from 0V as described above, oscillating ramp signal $V_{OSC-RAMP}$ starts at a voltage higher than 0V at time t0 due to some voltage shift proportional to the inductor current is immediately added when the initial SS phase starts at time t0. That is, during the "initial SS phase" (i.e., between time t0 and t2, while error amplifier output signal $V_{EA-OUT}$ is still very low), oscillating ramp signal $V_{OSC-RAMP}$ remains above error amplifier output signal $V_{EA-OUT}$ at the beginning of every clock cycle, and therefore the duty cycle during the initial SS phase is "0" (i.e., voltages $V_{PULSE}/V_{GN}$ remain at 0V). Theoretically, the initial SS phase duty cycle will remain "0" while error amplifier output signal $V_{EA\text{-}OUT}$ remains "out of dynamic range" (i.e., below some minimal level, e.g., voltage $V_{MIN}$, shown in FIG. 7(B)). That is, until error amplifier output signal $V_{EA\text{-}OUT}$ reaches minimum voltage $V_{MIN}$ (e.g., at time t2 in FIG. 7(B)), the feedback loop of buck converter 50 would remain open and uncontrollable (i.e., buck converter 50 would be operating as an open-loop circuit). This open-loop ("0" duty cycle) condition occurs before feedback signal $V_{FB}$ is established and stabilized, which is required for error amplifier 50 to function properly, and cannot be prevented.

FIGS. 8(A) and 8(B) are diagrams illustrating a conventional "minimum initial duty cycle" approach that addresses the "0" duty cycle problem and produces output voltage $V_{OUT}$ for the required minimum "on" time by "forcing" a minimum duty cycle. Specifically, PWM 52 (see FIG. 6) is configured in the conventional "minimum initial duty cycle" approach to generate voltages $V_{PULSE}/V_{GN}$ with a minimum duty cycle $D_{MIN}$ determined, for example, by dividing the required minimum "on" time by the normal system operating period set by oscillator 53. For example, if the required minimum "on" time for a given circuit is 100 nanoseconds and the system operating frequency is 1 Mhz, then the minimum duty cycle $D_{MIN}$ would be 100 ns/1 μs, or 0.1. Using this example, as illustrated in FIG. 8(B), voltages $V_{PULSE}/V_{GN}$ are therefore generated as 100 nanosecond pulses occurring every 1 μs (e.g., at the beginning of each pulse of oscillator signal $V_{OSC\text{-}RAMP}$) starting at time t0 and continuing through the initial SS phase (e.g., until error amplifier output signal $V_{EA\text{-}OUT}$ reaches minimum voltage $V_{MIN}$ needed for normal SS operations). Referring back to FIG. 8(A), starting at time t2 the duty cycle is then gradually increased to a final duty cycle $D_{FIN}$ at the end of the SS process, and as shown in FIG. 8(B) voltages $V_{PULSE}/V_{GN}$ are generated as increasingly longer pulses as the duty cycle increases. At the end of the SS process, the duty cycle is controlled by PWM 52 in accordance with the comparison between oscillating ramp signal $V_{OSC\text{-}RAMP}$ and error amplifier output signal $V_{EA\text{-}OUT}$ in the manner described above.

A further problem with the conventional "forced minimum duty cycle" approach described above with reference to FIGS. 8(A) and 8(B) is that it can still cause overshoot and inrush during the early portion of the initial SS phase. That is, even though the forced minimum duty cycle causes power transistor 55 to pass a limited amount of current to node N (FIG. 6), output voltage $V_{OUT}$ will increase to the voltage level of voltage $V_{LOUT}$ multiplied by the minimum duty cycle (i.e., $V_{OUT}$ equals system voltage $V_{DD}$ multiplied by duty cycle $D_{MIN}$), which can lead to overshoot and inrush at the beginning of the initial SS phase. Specifically, because every PWM/gate voltages $V_{PULSE}/V_{GN}$ associated with minimum duty cycle $D_{MIN}$ is at system voltage $V_{DD}$ during the initial SS phase, output voltage $V_{OUT}$ can be caused to undergo a rapid rise that overshoots the maximum load operating voltage and damages the load circuitry.

FIGS. 9(A), 9(B) and 9(C) illustrate a conventional "gradually increasing duty cycle" approach to address the additional start-up problem explained above with reference to FIG. 8(B). As indicated in FIG. 9(A), this approach involves causing oscillator 53 to generate oscillator ramp signal $V_{OSC\text{-}RAMP}$ such that it starts at a relatively low frequency (e.g., starting with a period that is much larger than 1 μs), and gradually increases until it reaches the normal system operating frequency (e.g., 1 Mhz) at a time t1. FIG. 9(B) depicts PWM/gate voltages $V_{PULSE}/V_{GN}$, which is made up of pulses generated in accordance with the gradually increasing frequency of oscillator ramp signal $V_{OSC\text{-}RAMP}$, whereby the period between pulses immediately after time t0 is much larger than 1 μs, and the period between pulses gradually reduces to 1 μs at time t1. Note that each pulse of PWM/gate voltages $V_{PULSE}/V_{GN}$ is minimized (e.g., 100 nanoseconds). As such, as illustrated in FIG. 9(C), the effective duty cycle associated with PWM/gate voltages $V_{PULSE}/V_{GN}$ gradually increases from a low number to the desired minimum duty cycle $D_{MIN}$ (e.g., 0.1) between time t0 and t1, and then increases as described above at time t2, thereby causing output voltage $V_{OUT}$ to rise at a much lower rate that prevents overshoot and inrush during the initial SS phase. Accordingly, the conventional "gradually increasing duty cycle" approach generates a gradually increasing duty cycle by causing oscillator 53 to generate oscillating ramp signal $V_{OSC\text{-}RAMP}$ at a gradually increasing rate, thereby both providing the necessary minimum "on" time to establish current replica stabilization, and also causing output voltage $V_{OUT}$ to increase at a slower rate that avoids overshoot and inrush during the initial SS phase.

A problem with the above-mentioned prior art "gradually increasing duty cycle" approach is that, by generating oscillating ramp signal $V_{OSC\text{-}RAMP}$ with a gradually increasing frequency during the initial SS phase, oscillator 53 can only be used to drive a single buck/boost converter circuit. In the example described above, once the initial SS phase is completed and buck converter 50 is operating normally, oscillator signal $V_{OSC\text{-}RAMP}$ is stabilized at the constant system operating frequency (e.g., 1 Mhz). Although this approach is acceptable when oscillator 53 provides oscillator ramp signal $V_{OSC\text{-}RAMP}$ to only one buck/boost converter, in many integrated circuits a single oscillator is used to drive two or more buck/boost converters in order to minimize chip area, and to synchronize the convertors' switching times during the normal operation in such a way that their power switches will never open/close in the same time to reduce the system noise and its effects. In contrast, when two different oscillators are used to drive two different converters, then the convertors are not synchronized, and simultaneous opening/closing of their power-switches can't be avoided. When a single oscillator is used to drive two or more buck/boost converters, the two or more buck/boost converters are initiated (started up) at different times during the start-up process for synchronization reasons. In this instance, in order to utilize the oscillator 53 to "soft-start" a second converter, it would be necessary to effectively "stop" and then restart oscillator 53 so that oscillator signal $V_{OSC\text{-}RAMP}$ rises from zero to minimum duty cycle $D_{MIN}$ as described above. However, restarting oscillator 53 would create a conflict in that it would disrupt the operation of buck converter 50, which could cause system failure. Accordingly, the conventional "gradually increasing duty cycle" solution can only be reliably used when each buck/boost converter circuit is provided its own oscillator, which increases the chip area required for implementing multiple buck/boost converters, and may lead to synchronization problems.

What is needed is a soft-start circuit in which an oscillator ramp signal is shared by multiple (buck or boost) DC-DC switching regulators started in sequence (i.e., one at a time) without having to restart the oscillator. What is also needed is method for performing a soft-start operation in which multiple switching regulators utilize a ramp signal generated by a single oscillator.

SUMMARY OF THE INVENTION

The present invention is directed to a novel soft-start process in which a constant frequency pulsed gate voltage is utilized to control the power switch (e.g., an n-channel or p-channel MOSFET) of one or more switching regulators (e.g., buck or boost converters) during the initial soft-start (SS) operating phase, wherein an amplitude of the gate voltage gradually changes (ramps) between two voltages such that the power switch incrementally increases from an initial (relatively low) "partially-on" state to a "fully-on" with each gate voltage pulse. Once the constant frequency pulsed gate voltage reaches a constant operating level (i.e., such that the power switch is fully turned on with each subsequent gate voltage pulse), the novel soft-start process is completed using conventional strategies (e.g., a minimum duty cycle is employed in which minimum "on" time pulses are generated until the amplifier control signal reaches a minimum voltage level, and then the duty cycle is gradually increased until the switching regulator is at a stable operating state). By utilizing the constant frequency "ramped" pulsed gate voltage during the initial SS phase, the novel soft-start process implemented by the present invention addresses the initial overshoot/inrush issues associated with the conventional basic soft-start process, and also avoids the single-oscillator issue associated with the above-mentioned prior art "gradually increasing duty cycle" approach. That is, by using "ramped" gate voltage pulses to slowly increase the amount of current/voltage passed through the power switch during the initial SS phase (i.e., instead of a slowly increasing oscillator frequency), the present invention is able to utilize a single "normal" oscillator operating at a constant system operating frequency (e.g., 1 Mhz) to sequentially "soft-start" two or more switching regulators.

According to an embodiment of the present invention, an integrated circuit is fabricated using know photolithographic techniques such that a functional (load) circuit, at least one switching regulator, and a soft-start circuit are fabricated on a single semiconductor "chip". The soft-start circuit utilizes a suitable circuit (e.g., a voltage ramp circuit) to generate the DC ramp voltage such that it gradually changes (e.g., increases from 0V to a system operating voltage, or decreases from the system operating voltage to 0V) at the beginning of the initial SS phase. The DC ramp voltage is transmitted to a switch control circuit of the switching regulator and serves as a power supply to the portion of the switch control circuit that generates the pulsed gate voltage, whereby the pulsed gate voltage is controlled to generate the "ramped" pulse pattern mentioned above during the initial SS phase. The "ramped" pulsed gate voltage is applied to the gate terminal of the switching regulator's power switch (transistor), whereby the "on" state of the power switch incrementally increases from an initial (relatively low) "partially-on" state to a "fully-on" with each successive gate voltage pulse during the initial SS phase. That is, the amplitude of each successive pulse of the pulsed gate signal is proportional to the instantaneous amplitude of the DC ramp voltage, which gradually changes during the initial soft-start phase, whereby each successive pulse has an amplitude that is greater (or less) than the preceding pulse. By controlling the rate at which the DC ramp voltage increases (or decreases), the corresponding "amplitude-ramped" pulsed gate signal causes the power switch to operate as a source-follower that "clamps" the inductor voltage to the corresponding "amplitude-ramped" pulsed gate signal, and therefore clamps the inductor voltage to the DC ramp voltage during the initial soft-start phase such that the output voltage is gradually increased/decreased at a rate that prevents voltage overshoot and inrush current without having to alter the oscillator frequency.

In accordance with an exemplary embodiment of the present invention, similar to conventional practices, each switch regulator (e.g., a buck converter or a boost converter) includes a switching circuit made up of an error amplifier and a pulse width modulator (PWM) circuit that operates in a conventional manner to generate a pulse signal in accordance with a supplied oscillating ramp voltage. In addition, using conventional techniques described above, the pulse signal is generated by the PWM circuit using the minimum duty cycle during the initial SS phase (i.e., while the error amplifier output signal is "out of dynamic range"), and the minimum duty cycle pulse signal is passed to a pre-driver (amplifier). According to the present invention, a power supply terminal of the pre-driver (amplifier) is connected to receive the DC ramp voltage, whereby the amplitude of the pulsed gate voltage generated at the output terminal of the pre-driver in response to the pulse signal is proportional to the DC ramp voltage received from the soft-start circuit, whereby the pulsed gate voltage is generated with the "ramped" pulse pattern mentioned above during the initial SS phase, thereby preventing voltage overshoot and inrush current during the initial soft-start phase.

According to another embodiment of the present invention, the integrated circuit includes two or more switching regulators that receive a constant-frequency oscillating ramp signal from a single oscillator circuit, and receive DC ramp voltages at different times such that the two or more switching regulators begin operating at different times. In contrast to conventional approaches that achieve "soft-start" by utilizing an oscillator signal that varies during the soft-start phase, the novel use of a DC ramp voltage to control the output voltage obviates the need to control the frequency of the oscillating ramp signal utilized by the switch control circuit to generate the pulsed gate signal, which in turn facilitates the use of a standard oscillator circuit that can be shared by more than one switching regulator. That is, the novel approach used by the present invention causes the regulated output voltage to gradually increase/decrease using a oscillating ramp signal that maintains a constant system frequency (e.g., 1 Mhz) during the entire initial soft-start phase. Accordingly, the present invention facilitates using a conventional "standard" oscillator circuit that can be shared by two or more switch regulators that begin operating at different times during the system start-up process, thus reducing production costs by minimizing the total size of each IC chip (i.e., in comparison to conventional approaches that use two or more oscillators whose signal varies during the soft-start operating phase), and facilitating synchronization of the two or more switching regulators (convertors) during the normal operation.

In exemplary embodiments, the soft-start circuit includes a ramp generator circuit that is coupled to the gate terminal of one of a PMOS source-follower transistor and an NMOS source-follower transistor, and an on/off control circuit that activates the ramp generator at the beginning of the initial soft-start operating phase. Various ramp generator circuit types may be utilized to generate the required ramp voltage, which may increase/decrease either linearly or non-linearly during the initial start-up operating phase, provided the resulting DC ramp voltage increases/decreases at a slow enough rate to avoid voltage overshoot and inductor inrush current in the associated load circuit. In a specific embodiment, the ramp generator circuit utilizes a capacitor and a current source to generate a ramp signal that is applied to the gate of either a PMOS source-follower transistor or an NMOS source-follower transistor, whereby the source follower transistor (which is connected to a system voltage supply by way of a suitable resistor) generates the required DC ramp voltage. An optional switch and associated logic circuit are used to discharge the capacitor prior to the initial soft-start phase. In the case of a buck converter, the (increasing) DC ramp voltage is supplied to the positive power terminal of the buck converter's pre-driver, whereby the amplitude (peak voltage level) of the pulsed gate signal gradually increases, e.g., from 0V to $V_{DD}$ during the initial SS phase. In the case of a boost converter, the (decreasing) DC ramp voltage is supplied to the negative power terminal of the buck converter's pre-driver, whereby the amplitude of the pulsed gate signal gradually decreases, e.g., from $V_{DD}$ to 0V during the initial soft-start phase. By controlling the amount of time required to charge the capacitor of the soft-start circuit, the rate at which the DC ramp voltage increases or decreases is controlled such that the output voltage is gradually increased/decreased at a rate that prevents voltage overshoot and inrush current.

According to another embodiment of the present invention, the soft-start circuit described above also includes a secondary soft-start circuit that functions to couple a constant system voltage (e.g., either system voltage or ground/0V) to the switch control circuit after completion of the initial soft-start phase. The secondary soft-start circuit is utilized, for example, in cases where the final amplitude of the DC ramp voltage may be inadequate for proper operation of the switching regulator, and serves to couple the pre-driver's power terminal to a "pure" source (e.g., the system supply voltage or system ground). In exemplary embodiments, the secondary soft-start circuit includes a logic circuit that detects when the initial soft-start phase is completed, and from that moment enables either a pull-up transistor (i.e., in the case of a buck converter) or a pull-down transistor (i.e., in the case of a boost converter) to a suitable fixed power supply. The fixed power supply is either supplied separately to the pre-driver, or supplied in parallel with the DC ramp signal. In alternative exemplary embodiments, the enabling signal can be produced using a voltage detector disposed in the logic circuit, or generated by a watch dog timer.

According to another embodiment, the present invention is directed to a soft-start methodology in which the amplitude of the pulsed gate signal supplied to a switch regulator's power switch during the initial soft-start phase of operation is gradually changed (increased or decreased), whereby a regulated output voltage passed from the power switch to a load circuit is gradually increased/decreased at a rate that prevents voltage overshoot and inrush current.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention is directed to improved switching regulators and switching regulator operating methods, and in particular to switching regulators/methods that implement a soft-start function. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). While the present invention is described below with specific reference to buck converters utilizing pulse width modulation, those skilled in the art will recognize that the analog soft-start circuit described herein may be employed in other types of switching regulators, such as boost, flyback converters or buck converters using pulse frequency modulation.

Figure 1:
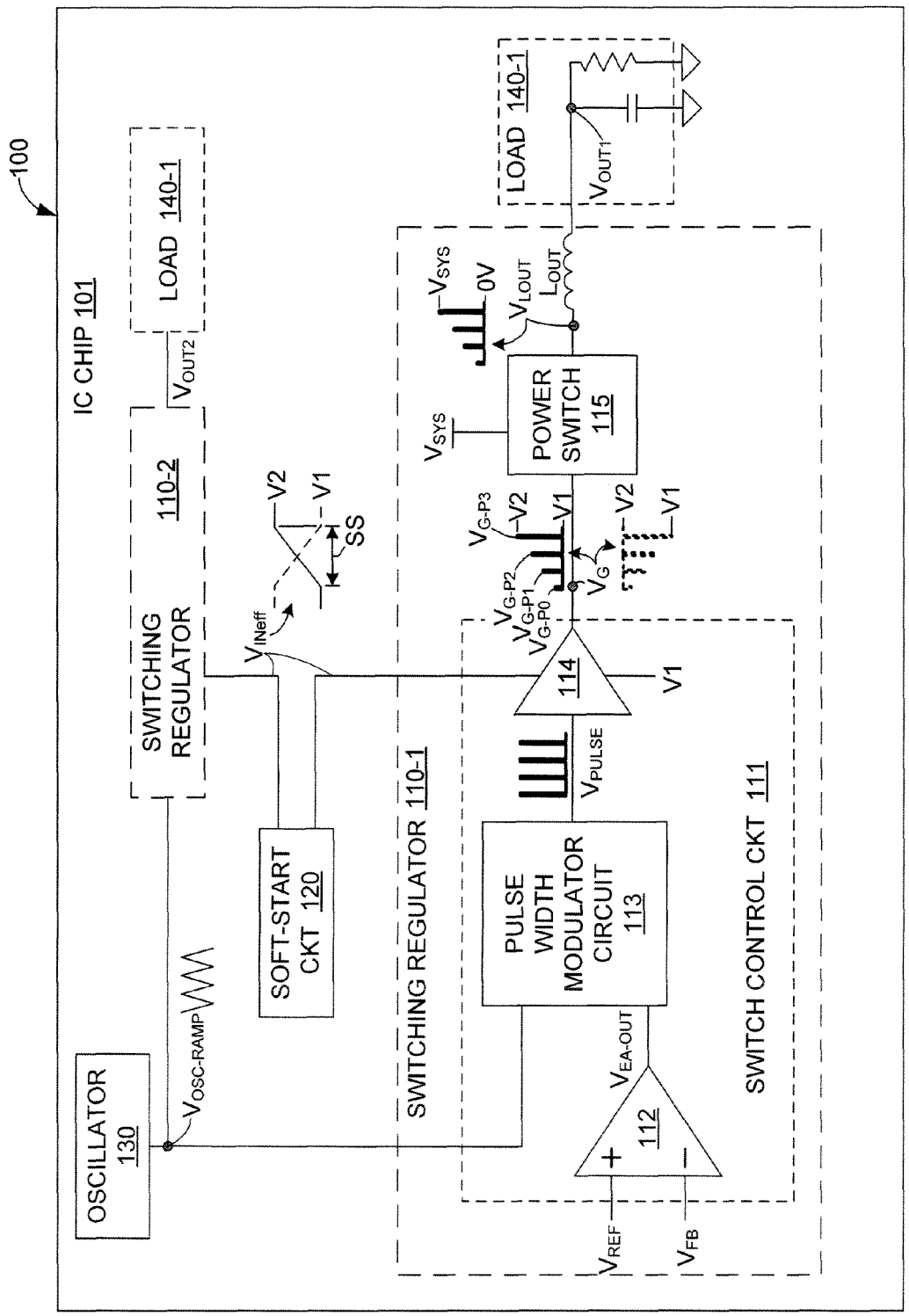
FIG. 1 is a modified block diagram depicting an integrated circuit including two switching regulators for supplying regulated output voltages to associated load circuits in accordance with a simplified exemplary embodiment of the present invention.

FIG. 1 is a modified block diagram depicting an integrated circuit (IC) circuit 100 including two switching regulators 110-1 and 100-2, a soft-start circuit 120, a single oscillator 130, and two load circuits 140-1 and 140-2 that are fabricated on a semiconductor substrate (e.g., a monocrystalline silicon IC chip) 101 using known IC (e.g., CMOS) fabrication techniques. During normal operation, switching regulators 110-1 and 100-2 receive a shared oscillating ramp signal $V_{OSC\text{-}RAMP}$ from oscillator 130, and respectively supply regulated output voltages $V_{OUT1}$ and $V_{OUT2}$ to associated load circuits 140-1 and 140-2. Oscillator 130 is constructed according to known techniques to generate oscillating ramp signal $V_{OSC\text{-}RAMP}$ at a predetermined constant system operating frequency (e.g., 1 Mhz). The particular circuitry forming load circuits 140-1 and 140-2, along with additional functional circuitry forming IC 100 (not shown), is not relevant to the present invention, and therefore a detailed explanation of these circuits is omitted for brevity.

Similar to conventional switching regulators, switching regulator 110-1 generally includes a switch control circuit 111 that generates a pulsed gate voltage $V_G$, and a power switch 115 (e.g., an n-channel or p-channel MOSFET) that generates regulated output voltage $V_{OUT1}$ in accordance with a duty cycle determined by pulsed gate voltage $V_G$. In the exemplary embodiment, switch control circuit 111 including an error amplifier (comparator) 112, a pulse width modulator (PWM) 113 and a pre-driver (amplifier) 114. Error amplifier 112 (e.g., an operational amplifier) includes an inverting input terminal ("−") connected to receive a feedback signal $V_{FB}$ and a non-inverting input terminal ("+") coupled to a predetermined reference voltage $V_{REF}$. In one embodiment feedback signal $V_{FB}$ and reference voltage $V_{REF}$ are generated in the manner described above with reference to prior art buck converter 50 (shown in FIG. 6). In accordance with known techniques, error amplifier 112 generates an amplifier control signal $V_{EA-OUT}$ in response to a difference between negative feedback signal $V_{FB}$ (i.e., a portion of regulated output voltage $V_{OUT1}$) and reference voltage $V_{REF}$. PWM circuit 113 receives amplifier output signal $V_{EA-OUT}$ and an oscillating ramp (sawtooth) signal $V_{OSC-RAMP}$ generated by oscillator 130, and according to known techniques generates a pulse output signal $V_{PULSE}$ in response to a comparison between amplifier output signal $V_{EA-OUT}$ and oscillating ramp signal $V_{OSC-RAMP}$. In one embodiment, a duty cycle of pulse output signal $V_{PULSE}$ increases in response to an increase in amplifier output signal $V_{EA-OUT}$, and decreases in response to a decrease in amplifier output signal $V_{EA-OUT}$. Pre-driver (amplifier) 114 generates gate signal $V_G$ by amplifying pulse output signal $V_{PULSE}$ such that, during normal (stabilized) operation, the high and low signal levels of gate signal $V_G$ are at respective voltage levels suitable for toggling power transistor 115 (i.e., such that power transistor 115 is fully turned on when pulse output signal $V_{PULSE}$ is in a first (e.g., high) voltage state, and such that power transistor 115 is fully turned off when pulse output signal $V_{PULSE}$ is in a second (e.g., low) voltage state). As is known in the art, the high and low voltage states of gate signal $V_G$ are determined by supply voltage signals applied to respective power (input) terminals of pre-driver 114. In the general case depicted in FIG. 1, the high and low voltage levels supplied to pre-driver 114 are referred to as voltages V1 and V2 to indicate that their relative voltage level (i.e., which is more positive than the other) is not specified. Power transistor 115 (e.g., an n-channel MOSFET or a p-channel MOSFET) has a first terminal connected to a system voltage source $V_{SYS}$ (which may be either V1 or V2, or another positive system source, or ground (0V)), a second terminal connected to load circuit 140-1, and a gate terminal connected to receive pulsed gate signal $V_G$ from an output terminal of pre-driver 114. During normal operation, power transistor 115 is repeatedly turned on and off in accordance with the duty cycle of pulsed gate signal $V_G$, whereby the resulting intermittent coupling of load 140-1 to system voltage $V_{SYS}$ generates an inductor voltage $V_{LOUT}$ that is passed through output inductor $L_{OUT}$ to generate output voltage $V_{OUT1}$ at the desired level during normal operation.

Figure 7A:
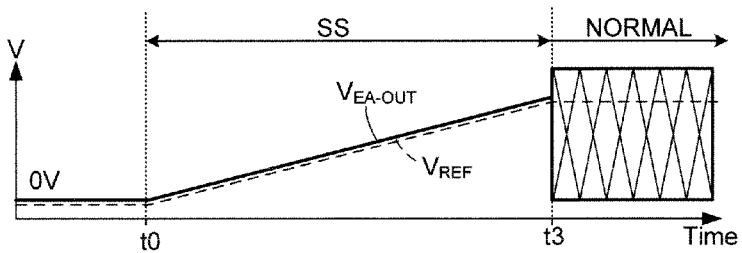
FIGS. 7(A) and 7(B) are diagrams showing various signals and values associated with basic soft-start operations utilized by the conventional switching regulator shown in FIG. 6.
Figure 7B:
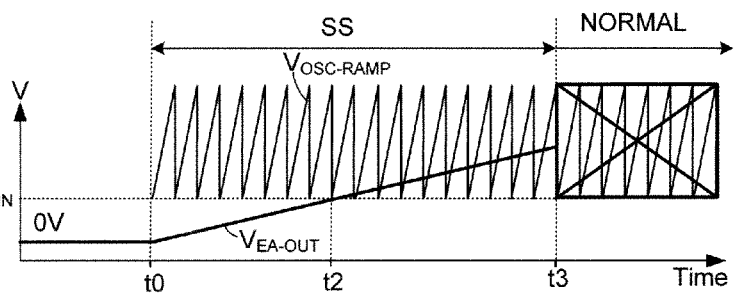
Figure 8A:
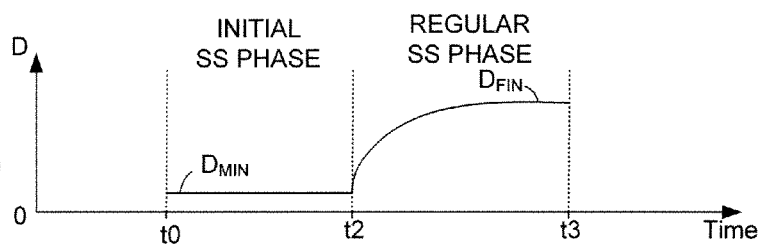
FIGS. 8(A) and 8(B) are diagrams showing various signals and values associated with a forced minimum duty cycle approach utilized during an initial soft-start phase by conventional switching regulators.
Figure 8B:
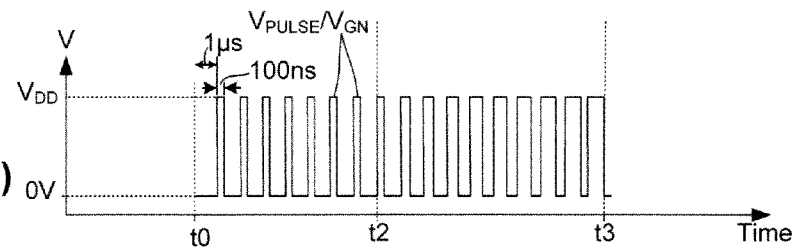
Figure 9A:
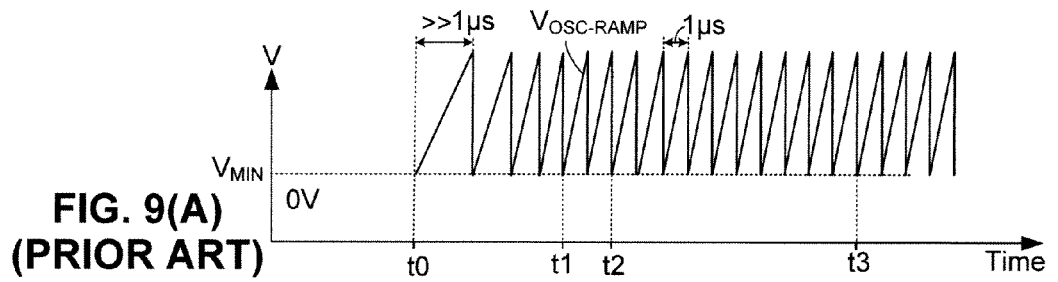
FIGS. 9(A), 9(B) and 9(C) are diagrams showing various signals and values associated with a gradually increasing duty cycle approach utilized by conventional switching regulators.
Figure 9B:
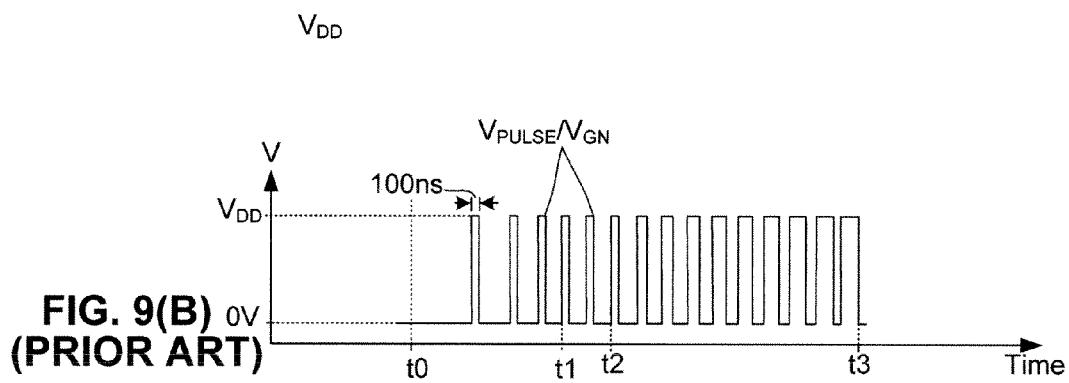
Figure 9C:
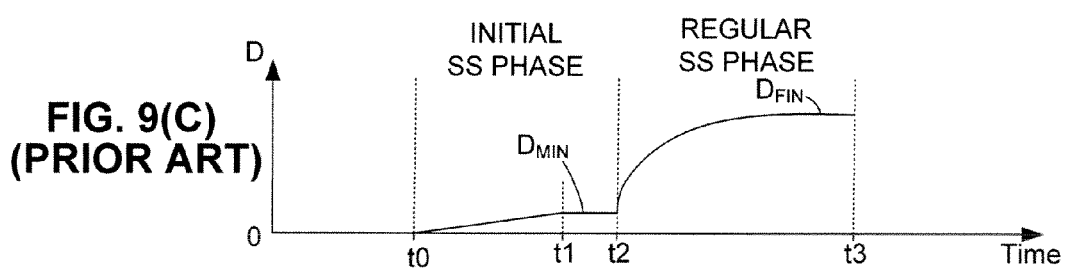

Similar to the conventional switching regulator described above with reference to FIG. 6, switching regulator 110-1 is configured to perform a soft-start operation that involves generating pulsed gate voltage $V_G$ using a minimum duty cycle in a manner similar to that described above with reference to FIGS. 6 to 9. Specifically, as described above with reference to FIGS. 7(A) and 7(B), error amplifier output signal $V_{EA-OUT}$ is gradually increased during the initial SS phase, for example, by causing reference voltage $V_{REF}$ to slowly increase from 0V to a normal operating level. In addition as described above with reference to FIGS. 8(A) and 8(B), PWM circuit 113 is configured to generate a PWM output voltage $V_{PULSE}$ according to a "forced" minimum initial duty cycle during the early stages of the initial SS phase to avoid the open-loop ("0" duty cycle) problem described above with reference to FIGS. 8(A) and 8(B).

Figure 6:
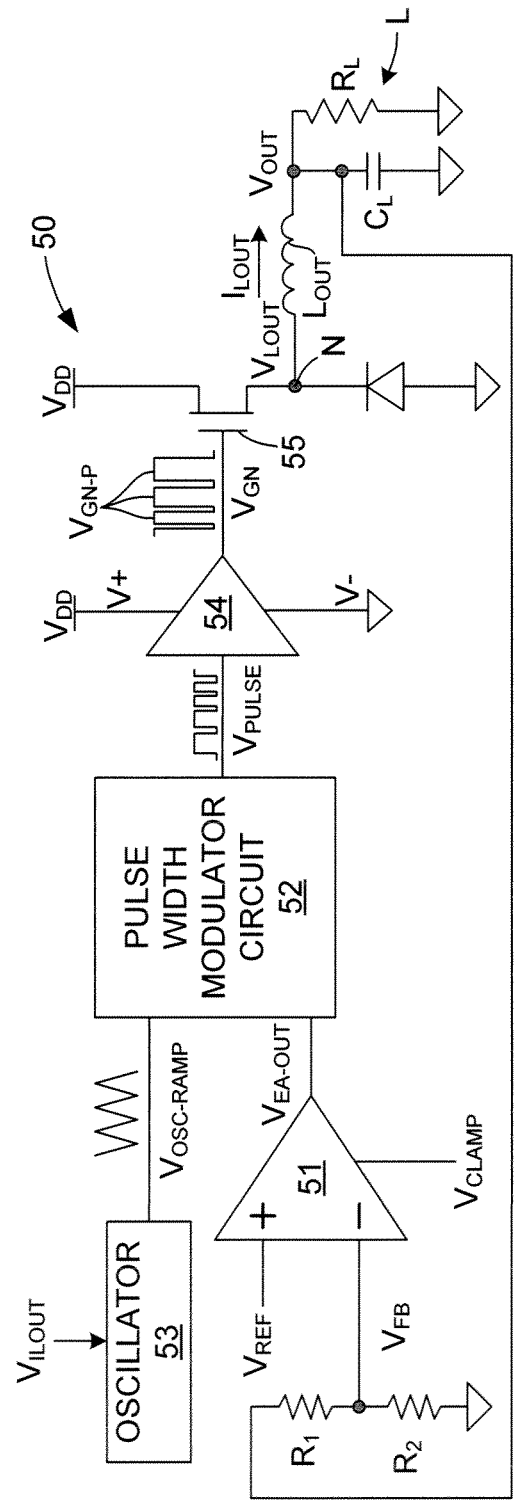
FIG. 6 is a simplified block diagram depicting a conventional switching regulator

Circuit 100 differs from the conventional arrangement described with reference to FIG. 6 in that, instead of implementing the "gradually increasing duty cycle" approach described above with reference to FIGS. 9(A) to 9(C), soft-start circuit 120 generates a direct current (DC) ramp voltage $V_{INeff}$ that is operably utilized to control the generation of pulsed gate voltage $V_G$ such that it gradually changes (e.g., increases from a first voltage V1 to a second voltage V2, or decreases from voltage V2 to voltage V1) during an initial SS phase (i.e., immediately after power is applied to the circuit). That is, PWM 113 operates essentially as described above with reference to FIGS. 8(A) and 8(B) to generate PWM output signal $V_{PULSE}$ at a "forced" minimum duty cycle during the initial SS phase (e.g., such that $V_{PULSE}$ comprises pulses generated each system operating cycle (e.g., with a period between pulses of 1 μs), and with each pulse having a duration set by the minimum "on-time" of circuit 100 (e.g., 100 nanoseconds). However, instead of implementing the "gradually increasing duty cycle" approach to deal with the problems associated with the forced minimum duty cycle, circuit 100 is constructed such that DC ramp voltage $V_{INeff}$ is operably supplied to switch control circuit 111 (e.g., applied to a power terminal of pre-driver 114), whereby pulsed gate voltage $V_G$ is "ramped" (i.e., has an amplitude that gradually sequentially increases or decreases) between voltages V1 and V2 during the initial SS phase in accordance with the instantaneous amplitude of DC ramp voltage $V_{INeff}$. Specifically, the amplitude of pulsed gate voltage $V_G$, which is indicated in FIG. 1 as being formed by signal pulses $V_{G-P0}$ to $V_{G-P3}$, is limited to the gradually changing amplitude of DC ramp voltage $V_{INeff}$ during initial soft-start phase SS. By controlling the rate at which DC ramp voltage $V_{INeff}$ increases (or decreases), the corresponding "ramped" pulsed gate signal $V_G$ causes power switch 115 to operate as a source-follower that "clamps" inductor voltage $V_{LOUT}$ to the corresponding "amplitude-ramped" pulsed gate signal $V_G$, and therefore clamps inductor voltage $V_{LOUT}$ to DC ramp voltage $V_{INeff}$ during initial soft-start phase SS such that output voltage $V_{OUT1}$ is gradually increased/decreased at a rate that prevents voltage overshoot and inrush current without having to alter the frequency of shared oscillator signal $V_{OSC-RAMP}$.

According to a feature of the embodiment illustrated in FIG. 1, oscillating ramp signal $V_{OSC-RAMP}$ is transmitted from oscillator circuit 130 to both switching regulators 110-1 and 110-2 of IC 100. That is, by using DC ramp voltage $V_{INeff}$ as described above to generate ramped output voltage $V_{OUT1}$ during initial soft-start phase SS, the novel approach of the present invention obviates the need to control the frequency of oscillating ramp signal $V_{OSC-RAMP}$, thereby facilitating the use of a "standard" oscillator circuit (i.e., an oscillator circuit that generates a constant frequency oscillating ramp signal at all times) that can be shared by more than one switching regulator of an IC circuit. Stated differently, the novel approach used by the present invention causes regulated output voltage $V_{OUT1}$ to gradually increase/decrease during the initial SS phase with oscillator 130 operating "normally" (i.e., such that oscillating ramp signal $V_{OSC-RAMP}$ is generated at a constant system frequency) during the entire soft-start process. Accordingly, the present invention facilitates using a conventional "standard" oscillator circuit 130 to a single constant-frequency oscillating ramp signal $V_{OSC-RAMP}$ shared by switch regulators 110A-1 and 110A-2, thus reducing production costs by eliminating the need for multiple oscillators. That is, because a single oscillator 130 can be shared by multiple switch regulators, the effective total area taken up by switch regulators 110-1 and 110-2 on IC chip 101 is effectively reduced (i.e., each IC chip is made smaller, allowing more IC chips per wafer). In other embodiments, when chip area is not a determining factor, an oscillator circuit can be provided for each switching regulator if desired, with the soft-start process described herein implemented by each switching regulator.

According to another feature of the embodiment illustrated in FIG. 1, switching regulator 110-2 includes circuitry similar to that of switching regulator 110-1 (described above), and one or more DC ramp voltages $V_{INeff}$ are supplied to both switching regulators 110-1 and 110-2. That is, a single soft-start circuit 120 is used to control both switching regulators 110-1 and 110-2 during the initial soft-start operating phase, thereby further reducing production costs and increasing production yields. When switching regulators 110-1 and 110-2 are started at the same time, soft-start circuit 120 generates a single DC ramp voltage $V_{INeff}$ that is simultaneously supplied to both switching regulators 110-1 and 110-2. Alternatively, when switching regulators 110-1 and 110-2 are started at different times during the start-up process, soft-start circuit 120 generates two DC ramp voltages $V_{INeff}$ that are respectively supplied to switching regulators 110-1 and 110-2. In other embodiments each switching regulator includes a unique soft-start circuit similar to that described above.

Figure 2:
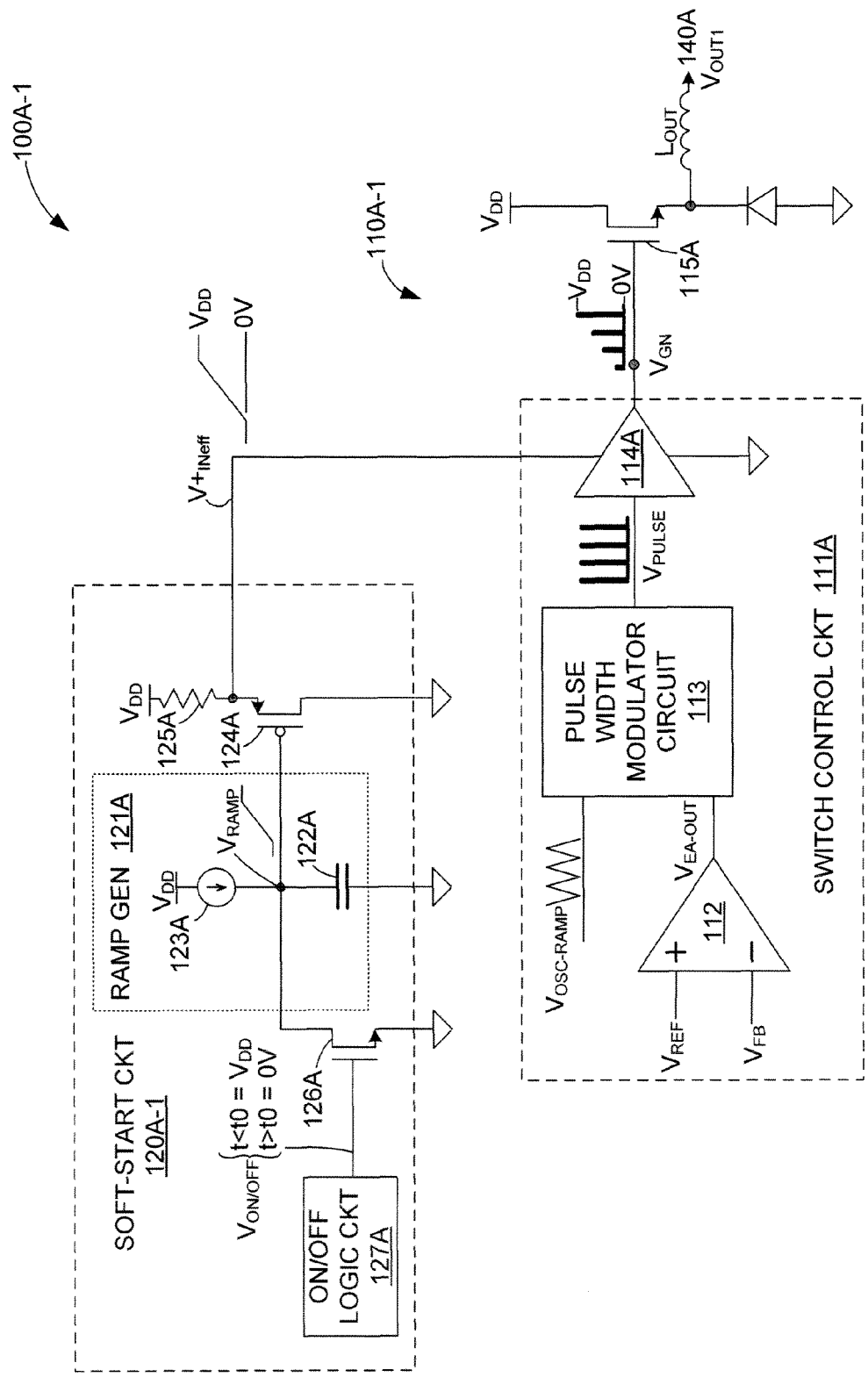
FIG. 2 is a circuit diagram showing a buck converter including a soft-start circuit in accordance with a specific embodiment of the present invention.

FIG. 2 is a circuit diagram showing a portion of an IC circuit 100A-1 including a buck converter (switching regulator) 110A-1 and an associated soft-start circuit 120A-1 according to an exemplary embodiment of the present invention.

Referring to the lower portion of FIG. 2, buck converter 110A-1 includes a switch control circuit 111A and an n-channel MOSFET (power switch) 115A connected between system voltage $V_{DD}$ and a load circuit 140A (not shown). Similar to the previous embodiment, switch control circuit 111A includes error amplifier 112 and PWM circuit 113 (which function as described above to generate pulse signal $V_{PULSE}$), and a pre-driver 114A. To facilitate the desired buck converter functionality, pre-driver 114A includes an input terminal connected to receive pulse signal $V_{PULSE}$ from PWM circuit 113, a positive power terminal connected to receive a DC ramp signal $V+_{INeff}$ from soft-start circuit 120A-1, a negative power terminal of pre-driver 114A connected to a low voltage source (e.g., ground or 0V), and an output terminal on which a pulsed gate voltage $V_{GN}$ is generated and applied to the gate terminal of n-channel MOSFET 115A.

Referring to the upper portion of FIG. 2, soft-start circuit 120A-1 generating a DC ramp voltage $V+_{INeff}$ that gradually increases from a low (first) voltage (e.g., 0V) to a high (second) voltage (e.g., $V_{DD}$) during the initial soft-start operating phase, whereby the amplitude of pulsed gate voltage $V_{GN}$ is controlled to gradually increase from the low (first) voltage to the high (second) voltage during the initial soft-start phase. In the exemplary embodiment shown in FIG. 2, soft-start circuit 120A-1 includes a ramp generator circuit 121A that is coupled to the gate terminal of a PMOS source-follower transistor 124A, and an on/off control circuit for activating ramp generator 121A at the beginning of the initial soft-start operating phase SS. Ramp generator circuit 121A includes a capacitor 122A and a current source 123A to generate a linear ramp signal $V_{RAMP}$ that is applied to the gate of PMOS source-follower transistor 124A, whereby PMOS source-follower transistor 124A (which is connected to system voltage supply $V_{DD}$ by way of a suitable resistor 125A) generates DC ramp voltage $V+_{INeff}$ such that it linearly increases from 0V to $V_{DD}$ at a rate determined by the size of capacitor 122A and the current generated by current source 123A. Ramp generator circuit 121A is controlled, for example, using an n-channel transistor 126A and an associated on/off logic circuit 127A, where on/off logic circuit 127A generates a high on/off signal $V_{ON/OFF}$ that turns on transistor 126A to discharge capacitor 122A prior to the initial soft-start phase, and generates a low on/off signal $V_{ON/OFF}$ during the initial soft-start phase that turns off transistor 126A.

Figure 3A:
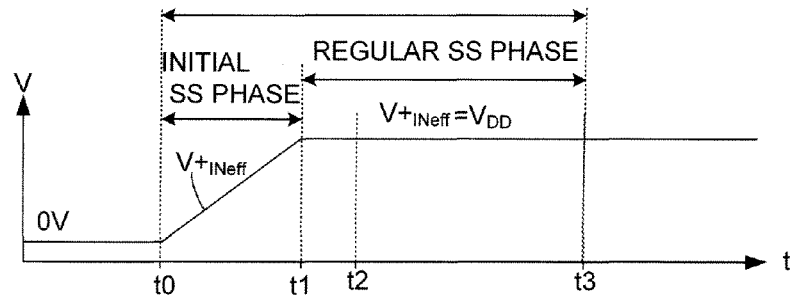
FIGS. 3(A), 3(B), 3(C) and 3(D) are timing diagrams showing various signals and values associated with operation of the buck converter of FIG. 2.
Figure 3B:
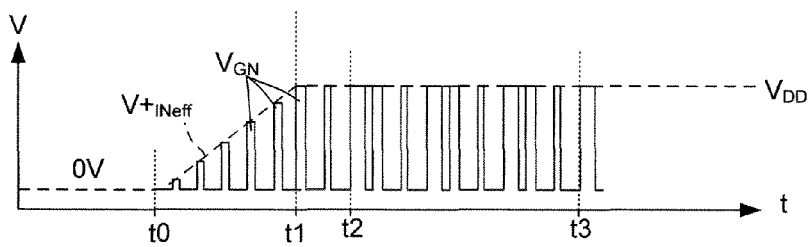
Figure 3C:
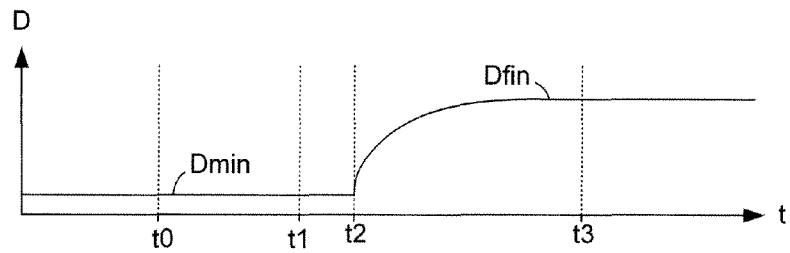
Figure 3D:
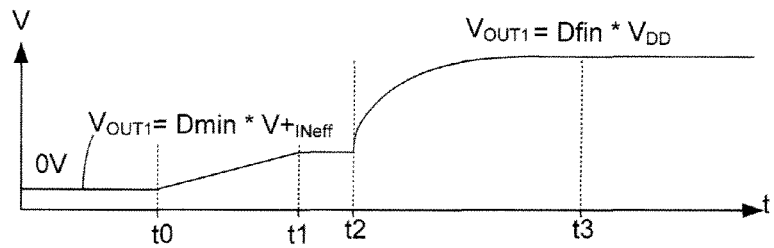

The operation of circuit 100A-1 (FIG. 2) will now be described with reference to FIGS. 3(A) to 3(D), where FIG. 3(A) shows DC ramp voltage $V+_{INeff}$ which is generated by soft-start circuit 120A-1 and applied to the positive power terminal of pre-driver 115A (see FIG. 2), FIG. 3(B) shows pulse gate signal $V_{GN}$ generated at the output of pre-driver 115A, FIG. 3(C) shows a duty cycle of PWM circuit 113, and FIG. 3(D) shows regulated output voltage $V_{OUT1}$. Referring to the upper portion of FIG. 3(A), for descriptive purposes the soft-start phase is divided into two parts referred to herein as the initial soft-start phase, which occurs between time t0 (i.e., when power is first applied to the circuitry), and a "regular" soft-start phase that occurs between time t1 and a time t3, at which point normal operation begins.

Referring to FIG. 2, as mentioned above ramp voltage $V_{RAMP}$ is maintained at 0V by way of pull-down transistor 126A, which couples capacitor 122A to ground in accordance with on/off control signal $V_{ON/OFF}$. With ramp voltage $V_{RAMP}$ at 0V, PMOS source-follower transistor 124A is maintained in a turned-on state, whereby DC ramp voltage $V+_{INeff}$ is held at 0V, as indicated in FIG. 3(A) by the section to the left of time t0. Of course, pulse gate signal $V_{GN}$ (FIG. 3(B)) and regulated output voltage $V_{OUT1}$ (FIG. 3(D)) are also 0V at this time, and the duty cycle of PWM circuit 113 (FIG. 3(C)) is maintained at a minimal amount $D_{min}$.

Referring to FIG. 2, at time t0 the initial soft-start phase begins when pull-down transistor 126A is turned off, which allows charge to begin collecting on capacitor 122A and causes ramp voltage $V_{RAMP}$ to begin increasing. As ramp voltage $V_{RAMP}$ increases from 0V, PMOS source-follower transistor 124A begins to turn off, whereby DC ramp voltage $V+_{INeff}$ begins to gradually increase from 0V, as indicated in FIG. 3(A) by the sloped-line section between times t0 and t1. As indicated in FIG. 3(B), pulse gate signal $V_{GN}$ comprises pulses having the same minimum duty rate $D_{min}$ of PWM output signal $V_{PULSE}$, and having amplitudes that incrementally increase (i.e., starting with a relatively low voltage level near time t0, and sequentially increasing until reaching system voltage $V_{DD}$ at time t1) in accordance with the increasing value of DC ramp voltage $V+_{INeff}$. As indicated in FIG. 3(D), regulated output voltage $V_{OUT1}$ also begins to increase from 0V during the initial soft-start phase. At the end of the initial soft-start phase (i.e., at time t1), DC ramp voltage $V+_{INeff}$ (FIG. 3(A)) and the amplitude of pulse gate signal $V_{GN}$ (FIG. 3(B)) reach maximum voltage levels (e.g., $V_{DD}$). However, because the duty rate of PWM circuit 113 is maintained minimum duty rate $D_{min}$, regulated output voltage $V_{OUT1}$ only increases to an intermediate voltage level, as indicated in FIG. 3(D). During the subsequent regular soft-start phase (e.g., at time t2), the duty rate of PWM circuit 113 increased from $D_{min}$ in accordance with a predetermined increase rate, as indicated in FIG. 3(C), until it reaches a final value $D_{fin}$ at time t3. As indicated in FIG.

3(D), the increasing duty cycle allows regulated output voltage $V_{OUT1}$ to increase to its final regulated level.

Referring again to FIG. 2, although exemplary ramp generator 121A is implemented using a capacitor and current source, in alternative embodiments other ramp generator circuit types may be utilized to generate the required ramp voltage, which may increase either linearly (as indicated in FIG. 2 or non-linearly during the initial start-up operating phase, provided DC ramp voltage $V_{INeff}$ increases at a slow enough rate to avoid voltage overshoot and inductor inrush current in load circuit 140A.

Figure 4:
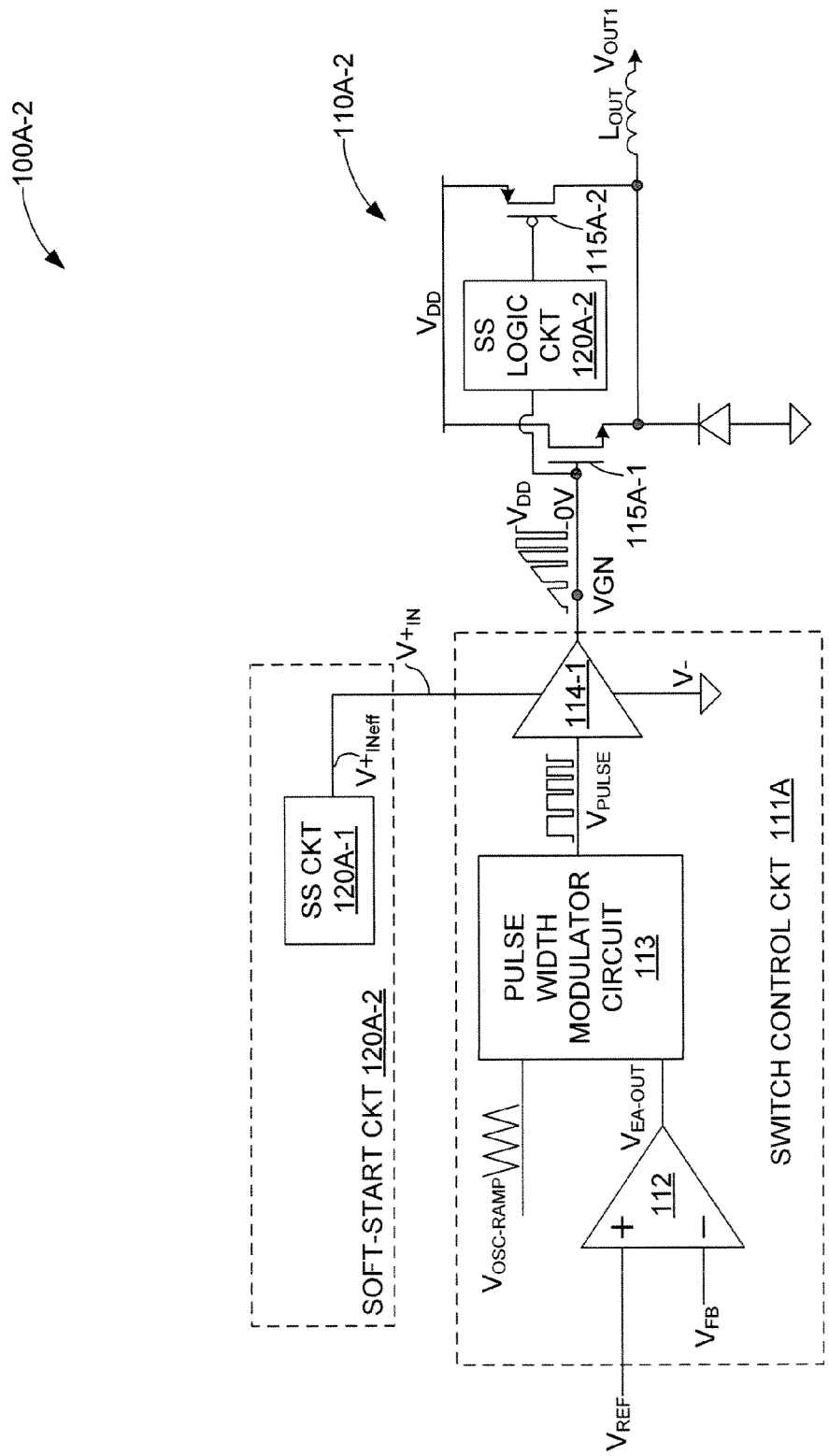
FIG. 4 is a circuit diagram showing a buck converter in accordance with another specific embodiment of the present invention.

FIG. 4 is a circuit diagram showing a portion of an IC circuit 100A-2 including a buck converter (switching regulator) 110A-2 and exemplary soft-start circuit 120A-2 according to another exemplary embodiment of the present invention. Buck converter 110A-2 is similar to buck converter 110A-1 (described above) in that it includes the same switch control circuit 111A as that described above, and in that a portion of soft-start circuit 120A-2 comprises soft-start circuit 120A-1 that generates DC ramp voltage $V+_{INeff}$ in the manner described above. Buck converter 110A-2 differs from buck converter 110A-1 in that it includes a PMOS power switch 115A-2 connected in parallel with NMOS power switch 115A-1, where NMOS power switch 115A-1 functions as described above during the start-up phase, and then PMOS power switch 115B-2 takes over during normal operation. PMOS power switch 115B-2 is controlled by a SS logic circuit 120A-2 such that it remains off (disabled) during the start-up process, and is then coupled by SS logic circuit 120A-2 to the output terminal of pre-driver 114-1 to function as the converter's "main" power switch during normal operations. That is, during the initial phase the "main" power switch (i.e., PMOS power switch 115A-2) is turned off, and only NMOS power switch 115A-1 operates as a clamp (source-follower) according to the description provided above. After the start-up phase is completed, PMOS power switch 115A-2 is enabled such that PMOS power switch 115A-2 functions as the main power switch for buck converter 110A-2. The decision when parallel PMOS power switch 115A-2 is enabled is provided by SS logic circuit 120A-2 (e.g., using a watchdog timer, or by any other preferred method). The benefit of this arrangement is lower resistance provided by using PMOS power switch 115A-2 during normal operations, which increases the efficiency of buck converter 110A-2. NMOS power switch 115A-1 operates in parallel with PMOS power switch 115A-2 during normal operation.

Figure 5:
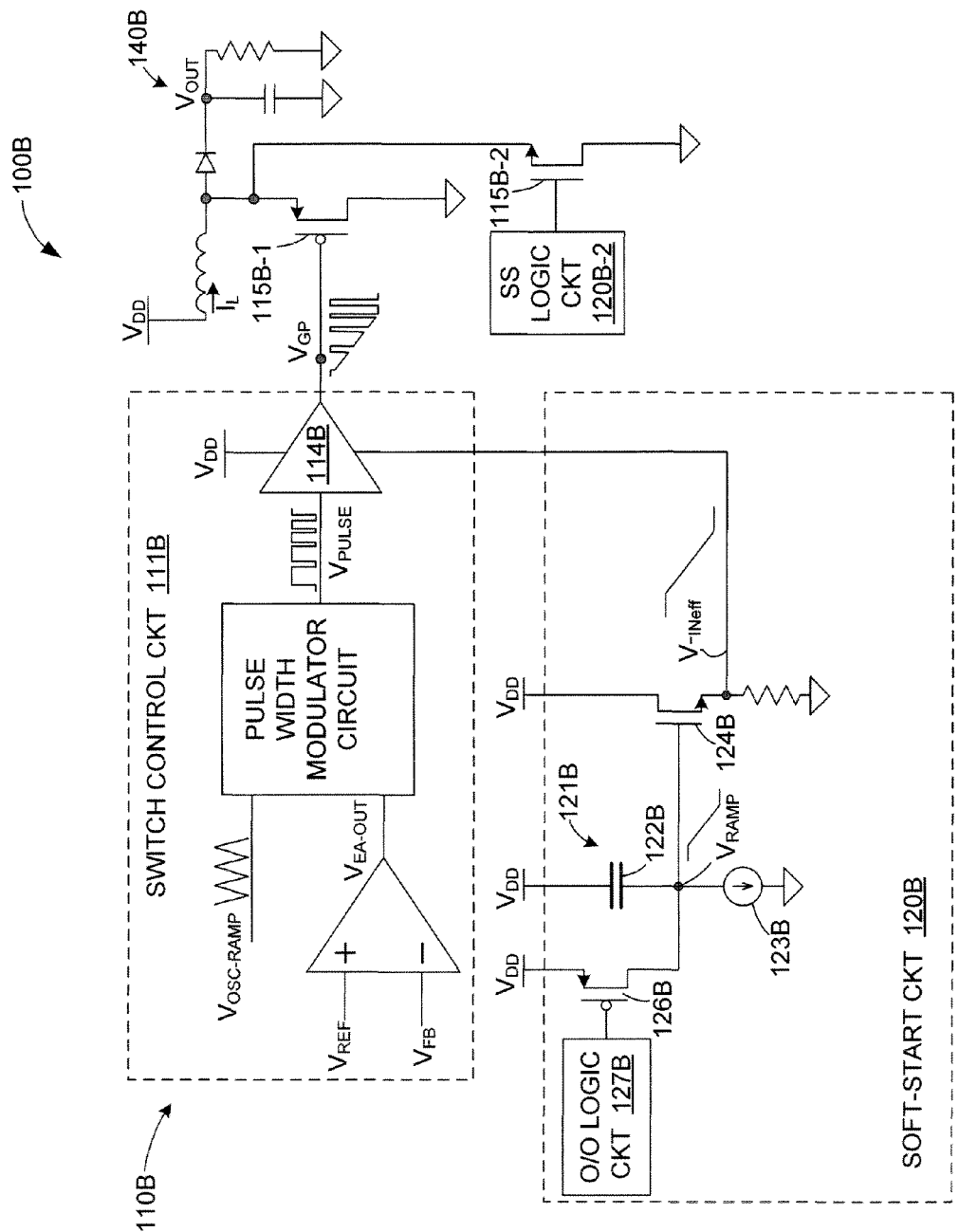
FIG. 5 is a circuit diagram showing a boost converter including a soft-start circuit in accordance with another specific embodiment of the present invention.

FIG. 5 is a circuit diagram showing a portion of an IC circuit 100B including a boost converter (switching regulator) 110B and exemplary soft-start circuit 120B according to another exemplary embodiment of the present invention. Similar to the buck converter embodiments described above, boost converter 110B generates a regulated output voltage $V_{OUT}$, but in this case using a p-channel MOSFET (power switch) 115B-1 that is connected between a load 140B and ground. P-channel MOSFET 115B-1 is controlled by a pulsed gate voltage $V_{GP}$ generated by a switch control circuit 111B that is constructed substantially identically with that of the buck converters described above, but in this case soft-start circuit 120B applies a DC ramp voltage $V-_{INeff}$ to a negative power terminal of pre-driver 114B, with the positive power terminal of pre-driver 114B connected to system voltage $V_{DD}$, whereby the amplitude of pulsed gate voltage $V_{GP}$ gradually decreases from $V_{DD}$ to 0V during the initial soft-start period. Also similar to the buck converter embodiments, soft-start circuit 120B includes a ramp generator circuit 121B coupled to the gate terminal of an NMOS source-follower transistor 124B, and a pull-up transistor 126B and associated ON/OFF control circuit 127B for activating ramp generator 121B at the beginning of the initial soft-start operating phase SS. Ramp generator circuit 121B includes a current source 122B coupled to a capacitor 123B and configured such that linearly varying ramp voltage $V_{RAMP}$ decreases during the initial soft start phase, whereby DC ramp voltage $V-_{INeff}$ gradually decreases from $V_{DD}$ to 0V during the initial soft-start operating phase SS, thereby generating the desired decreasing amplitude pulsed gate voltage $V_{GP}$ that causes p-channel MOSFET 115B-1 to generate output voltage $V_{OUT}$ such that it gradually decreases from $V_{DD}$ to 0V during the initial soft-start phase in order to prevent voltage overshoot and inrush current at load 140B. Boost converter 110B also includes an optional NMOS power switch 115B-2 and associated SS logic circuit 120B-2 that function in a manner similar to PMOS power switch 115A-2 and logic circuit 120A-2, which are described above with reference to FIG. 4.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. An integrated circuit comprising:
    a load circuit;
    a switching regulator for supplying a regulated output voltage to the load circuit, the switching regulator comprising:
    a switch control circuit including means for generating a pulsed gate voltage signal;
    a power switch coupled to a system operating voltage source and the load and having a gate terminal connected to receive the pulsed gate voltage signal; and
    a soft-start circuit including means for generating a direct current (DC) ramp voltage that gradually changes between a first voltage and a second voltage during an initial soft-start operating phase,
    wherein soft-start circuit is coupled to supply the the DC ramp voltage to the switch control circuit such that an amplitude of the pulsed gate voltage gradually changes between the first and second voltages during the initial soft-start phase, and
    wherein the soft-start circuit comprises a ramp generator circuit coupled to the gate terminal of one of a PMOS source-follower transistor transistor and an NMOS source-follower transistor, and means for activating the ramp generator at the beginning of the initial soft-start operating phase.

2. The integrated circuit of claim 1,
    wherein the switch control circuit comprises:
    a comparator configured to generate an amplifier control signal in response to a portion of the regulated output voltage and a predetermined reference voltage;
    a pulse width modulator (PWM) circuit configured to generate a pulse signal in response to an oscillating ramp signal and the amplifier control signal; and
    an amplifier configured to generate said pulsed gate voltage signal in response to the pulse signal, and
    wherein the soft-start circuit is coupled to the amplifier such that the DC ramp voltage is supplied to a power terminal of the amplifier.

3. The integrated circuit of claim 1,
wherein the integrated circuit comprises two or more said switching regulators, two or more load circuits respectively coupled to receive regulated voltages from said two or more said switching regulators, said soft-start circuit, and an oscillator that are fabricated on a semiconductor substrate, and
wherein a constant-frequency ramp signal generated by said oscillator is transmitted to each of said two or more switching regulators.

4. The integrated circuit of claim 3, wherein both of the two or more said switching regulators are coupled to receive said DC ramp voltage generated by said soft-start circuit.

5. The integrated circuit of claim 1, wherein the ramp generator circuit comprises means for generating one of a linear ramp voltage and a non-linear ramp voltage.

6. The integrated circuit of claim 1, wherein the ramp generator circuit comprises a current source coupled to a capacitor.

7. The integrated circuit of claim 1,
wherein the switching regulator comprises a buck converter;
wherein the power switch comprises an n-channel transistor; and
wherein the soft-start circuit comprises means for generating said DC ramp voltage such that said DC ramp voltage gradually increases from said first voltage to said second voltage during said initial soft-start operating phase, whereby the amplitude of the pulsed gate voltage incrementally increases between the first voltage and the second voltages during the initial soft-start phase.

8. The integrated circuit of claim 1,
wherein the switching regulator comprises a boost converter;
wherein the power switch comprises a p-channel transistor; and
wherein the soft-start circuit comprises means for generating said DC ramp voltage such that said DC ramp voltage gradually decreases from said second voltage to said first voltage during said initial soft-start operating phase, whereby the amplitude of the pulsed gate voltage gradually decreases from the second voltage to the first voltage during the initial soft-start phase.

9. The integrated circuit of claim 1, wherein the soft-start circuit further comprises means for coupling a constant system voltage to the switch control circuit after completion of the initial soft-start phase.

10. The soft-start circuit of claim 1,
wherein the switching regulator comprises a boost converter;
wherein the power switch comprises a p-channel transistor; and
wherein said means for generating said DC ramp voltage comprises means for causing said DC ramp voltage to gradually decrease from said second voltage to said first voltage during said initial soft-start operating phase, whereby the amplitude of the pulsed gate voltage gradually decreases from the second voltage to the first voltage during the initial soft-start phase.

11. A soft-start circuit for a switching regulator utilized to supply a regulated output voltage to a load circuit, the switching regulator including:

a switch control circuit including:
a comparator configured to generate an amplifier control signal in response to a portion of the regulated output voltage and a predetermined reference voltage,
a pulse width modulator (PWM) configured to generate a pulse signal in response to an oscillating ramp signal and the amplifier control signal, and
an amplifier configured to generate a pulsed gate voltage signal in response to the pulse signal; and
a power switch coupled to a system operating voltage source and the load circuit and having a gate terminal connected to receive the pulsed gate voltage signal,
wherein the soft-start circuit comprises means for generating a direct current (DC) ramp voltage that gradually changes between a first voltage and a second voltage during an initial soft-start operating phase,
wherein the soft-start circuit is coupled to supply the DC ramp voltage to a power terminal of the amplifier such that an amplitude of each sequentially occurring voltage pulse of a series of voltage pulses making up the pulsed gate voltage gradually changes between the first and second voltages during the initial soft-start phase in accordance with the DC ramp voltage, and
wherein the associated amplitudes of at least some of the sequentially occurring said voltage pulses causes the switch control circuit to partially turn on such that a voltage generated on an output terminal of the power switch gradually changes during the initial soft-start phase at a rate that prevents voltage overshoot in the load circuit.

12. The soft-start circuit of claim 11,
wherein the switching regulator comprises a buck converter;
wherein the power switch comprises an n-channel transistor; and
wherein said means for generating said DC ramp voltage comprises means for causing said DC ramp voltage to gradually increase from said first voltage to said second voltage during said initial soft-start operating phase, whereby the amplitude of the pulsed gate voltage gradually increases from the first voltage to the second voltage during the initial soft-start phase.

13. A method for generating a soft-start in a switching regulator, the switching regulator including a switch control circuit for generating a pulsed gate voltage signal, and a power switch coupled between a system operating voltage source and a load circuit and having a gate terminal connected to receive the pulsed gate voltage signal, the method comprising:
generating a direct current (DC) ramp voltage that gradually changes between a first voltage and a second voltage during an initial soft-start phase; and
generating the pulsed gate voltage signal including a series of sequential voltage pulses such that an associated amplitude of each sequentially occurring said voltage pulse of the series of voltage pulses incrementally changes between the first and second voltages during the initial soft-start phase in accordance with the DC ramp voltage, wherein the associated amplitudes of at least some of the sequentially occurring said voltage pulses causes the switch control circuit to partially turn on such that an output voltage supplied to the load circuit gradually increases to a system voltage level during the initial soft-start phase.

14. The method of claim 13,
wherein the switch control circuit further comprises:
- a comparator for generating an amplifier control signal in response to a portion of the regulated output voltage and a predetermined reference voltage;
- a pulse width modulator (PWM) for generating a pulse signal in response to an oscillating ramp signal and the amplifier control signal; and
- an amplifier for generating said pulsed gate voltage signal in response to the pulse signal, and wherein using the DC ramp voltage to control the switch control circuit comprises supplying the DC ramp voltage a power terminal of the amplifier.

15. The method of claim 13, wherein generating the DC ramp voltage comprises coupling a ramp generator circuit to one or said first or second voltages at the beginning of the initial soft-start operating phase.

16. The method of claim 13, wherein generating said DC ramp voltage comprises generating one of a linear ramp voltage and a non-linear ramp voltage.

17. The method of claim 13, further comprising coupling a constant system voltage to the switch control circuit after completion of the initial soft-start phase.

18. The method of Claim 13,
wherein the switching regulator comprises a buck converter;
wherein the power switch comprises an n-channel transistor; and
wherein generating said DC ramp voltage comprises causing said DC ramp voltage to gradually increase from said first voltage to said second voltage during said initial soft-start operating phase, whereby the amplitude of the pulsed gate voltage gradually increases from the first voltage to the second voltage during the initial soft-start phase.

19. The method of claim 13,
wherein the switching regulator comprises a boost converter;
wherein the power switch comprises a p-channel transistor; and
wherein generating said DC ramp voltage comprises causing said DC ramp voltage to gradually decrease from said second voltage to said first voltage during said initial soft-start operating phase, whereby the amplitude of the pulsed gate voltage gradually decreases from the second voltage to the first voltage during the initial soft-start phase.

* * * * *